(No Model.)

M. C. PARKER.
THILL COUPLING.

No. 509,485.        Patented Nov. 28, 1893.

Attest:
Elliott P. Hough.
C. E. Jones.

Inventor:
Mahlon C. Parker
By Chas J. Gooch
atty

THE NATIONAL LITHOGRAPHING COMPANY,
WASHINGTON, D. C.

UNITED STATES PATENT OFFICE.

MAHLON C. PARKER, OF WAVERLY, PENNSYLVANIA.

THILL-COUPLING.

SPECIFICATION forming part of Letters Patent No. 509,485, dated November 28, 1893.

Application filed February 13, 1893. Serial No. 462,166. (No model.)

*To all whom it may concern:*

Be it known that I, MAHLON C. PARKER, a citizen of the United States, residing at Waverly, in the county of Lackawanna and State of Pennsylvania, have invented certain new and useful Improvements in Thill-Couplings; and I do hereby declare the following to be a full, clear, and exact description of the invention, such as will enable others skilled in the art to which it appertains to make and use the same.

This invention relates to improvements in thill-couplings.

The improved coupling consists of a strip of spring metal coiled at its rear portion to receive the axle and, at its extreme rear end, having a flat transverse and sidewise extension which rests upon and is bolted or clipped to the axle the front end of said coupling extending forwardly in a substantially straight line and being clipped or otherwise secured to the thill, the object being, by means of a spring coupling of simple and inexpensive construction, to overcome and prevent the transmission to the vehicle of the motion of the horse drawing the same.

Figure 1:
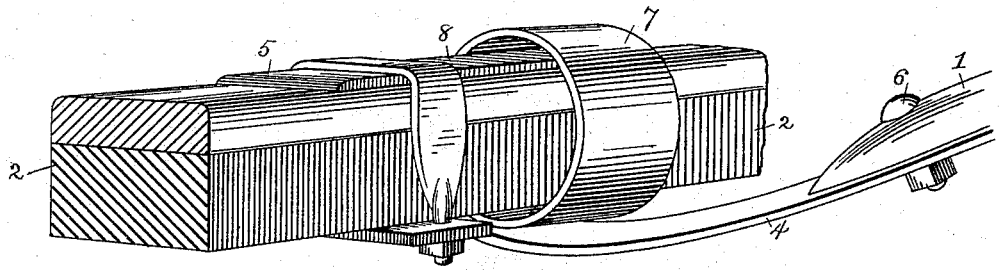
Figure 2:
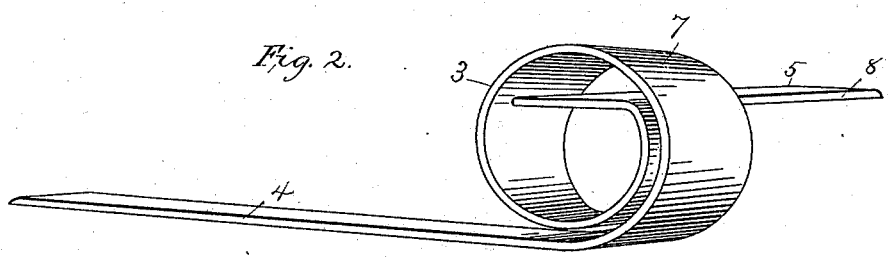

In the drawings Figure 1 represents a perspective view of my improved coupling in use, and Fig. 2, a detached view of the spring clip.

1 represents a portion of one of the thills or shafts of a vehicle. 2 represents the front axle thereof.

3 represents my improved spring-coupling elastically connecting said thills and axle for the purpose of taking up and lessening or overcoming and preventing the transmission from the thills to the body of the vehicle of the motions of the draft horse or horses. This coupling consists of a single strip of spring steel or other metal either flat its entire length as shown, or of rounded contour, with flattened ends 4, 5. The flat front portion, 4, of my spring coupling extends forwardly a suitable distance and is bolted, clipped, or otherwise removably secured, as at 6, to the thills 1. At the rear of said flat front portion, 4, the strip is coiled in the form of one or more leaves, 7, through which the axle, 2, is passed as shown. The inner end of the coil, 7, is formed flat and extends in a sidewise direction, as at 8, beyond said coil, 7, said extension or lip, 8, resting against and being bolted, clipped or otherwise removably secured to the axle of the vehicle as shown. It will thus be seen that the spring coil extends around the axle, which is passed therethrough, and that the coupling has positive bearing, by means of the transverse extension, 8, upon the axle, over an area beyond that of the width of the coil which is suspended by such transverse extension, 8, upon the axle. By this construction the maximum of distribution of the oscillation of the horse's movements and of elastic connection between the thills and axle are attained with the employment of a minimum quantity of material in the construction of the spring-coupling thereby avoiding the necessity of constructing the coupling with a series of sidewise-extending coils extending a distance parallel with or along the axle.

It will readily be observed that spring-couplings according to my invention can be very easily, readily and cheaply manufactured, can be easily applied and removed, will be effective in operation, present a neat appearance and do not embrace any redundant parts or any parts unnecessarily projecting or liable to contact with other parts of the vehicle.

Having thus described my invention, what I claim is—

A thill-coupling consisting of a single strip of spring metal having a flat front end adapted to be removably attached to a thill, a coiled inner or rear portion which surrounds and within which the vehicle axle is received and a flat horizontally and transversely-extending rear end said rear portion extending horizontally beyond the coil and resting upon the axle, in combination with bolts, clips, or analogous devices removably connecting said flat ends, respectively, to the thill and axle, substantially as and for the purpose set forth.

In testimony whereof I affix my signature in presence of two witnesses.

MAHLON C. PARKER.

Witnesses:
 N. C. MACKEY,
 E. J. STONE.